(12) United States Patent
Cherukuri

(10) Patent No.: US 6,365,209 B2
(45) Date of Patent: Apr. 2, 2002

(54) CONFECTIONERY COMPOSITIONS AND METHODS OF MAKING

(75) Inventor: Subraman Rao Cherukuri, Vienna, VA (US)

(73) Assignee: Capricorn Pharma, Inc., Frederick, MD (US)

( * ) Notice: Subject to any disclaimer, the term of this patent is extended or adjusted under 35 U.S.C. 154(b) by 0 days.

(21) Appl. No.: 09/777,927

(22) Filed: Feb. 7, 2001

Related U.S. Application Data

(63) Continuation-in-part of application No. 09/587,971, filed on Jun. 6, 2000.

(51) Int. Cl.[7] .............................. A23L 1/30; A23L 1/303; A23L 1/304
(52) U.S. Cl. ..................... 426/72; 424/463; 424/408; 424/409; 424/439; 424/440; 424/474; 426/4; 426/72; 426/74; 426/103; 426/638; 426/650; 426/660; 514/777; 514/947; 514/948; 514/951; 514/959
(58) Field of Search .......................... 426/4, 72, 74, 426/103, 638, 650, 660; 424/463, 408, 409, 439, 440, 474; 514/777, 947, 948, 951, 959

(56) References Cited

U.S. PATENT DOCUMENTS

| 4,568,560 A | 2/1986 | Schobel |
| 4,740,376 A | 4/1988 | Yang |
| 4,975,270 A | 12/1990 | Kehoe |
| 4,981,698 A | 1/1991 | Cherukuri et al. |
| 5,004,595 A | 4/1991 | Cherukuri et al. |
| 5,266,335 A | 11/1993 | Cherukuri et al. |

FOREIGN PATENT DOCUMENTS

| EP | 0 273 001 | 6/1988 |

*Primary Examiner*—Helen Pratt
(74) *Attorney, Agent, or Firm*—Nath & Associates PLLC; Gary M. Nath; Jerald L. Meyer

(57) ABSTRACT

A novel encapsulated product is provided and includes: at least one active ingredient; at least one compressible material; and at least one tableting material; wherein the encapsulated product is in the form of a caplet having a diameter of from about 1 millimeter to about 7 millimeters and a length from about 1 millimeter to about 7 millimeters. A method for preparing the encapsulated product is also provided. The encapsulated product may be incorporated into a food item, a soft confectionery product, a hard confectionery product, a jelly gum confectionery product, and a dry beverage or chewing gum product.

45 Claims, No Drawings

CONFECTIONERY COMPOSITIONS AND METHODS OF MAKING

This application is a continuation-in-part application of U.S. patent application Ser. No. 09/587,971, filed Jun. 6, 2000, the entire contents of which are hereby incorporated in their entirety.

BACKGROUND OF THE INVENTION

1. Field of the Invention

The present invention relates to an alternate encapsulation process, and in particular, an alternate encapsulation process for concentrating additives using compression. The present invention also relates to confectionery compositions and nutritional bars containing the alternate encapsulation products.

2. Description of the Prior Art

Various types of chewable articles are known in commerce. These articles include food items such as food items, confectionery items and chewing gum. The chewable articles often include various types of active agents or ingredients within the chewable articles. Examples of such active ingredients include flavors, sweeteners, colors, medicaments, vitamins, minerals, and other effervescent agents.

It has been known in the art of food stuff, confectionery and chewing gum preparation to provide protection to the active ingredients by the use of protection systems, including providing a protective coating around the active ingredient or encapsulating the active ingredient. Such protective systems have been employed for various reasons, such as for protection of the active ingredient, both while on the shelf and during use, and for prolonged release in the oral cavity.

It is known in the art to protect active ingredients by encapsulating the active ingredient prior to introducing the ingredient into a final product. Some of the major classifications of encapsulation technology include liquid suspending media (water-in-oil emulsions and oil-in-water emulsions), interfacial and in situ polymerization, solvent evaporation from emulsions, desolvation, complex coacervation, polymer and polymer incompatibility, gelation, and pressure extrusion. One of skill in the art will be familiar with each of these classifications.

Schobel, U.S. Pat. No. 4,568,560, discloses encapsulated fragrances and flavors for use in denture cleanser compositions. Schobel discloses encapsulating a solid particulate flavoring agent or fragrance with a film of an acrylic polymer and ethylcellulose. The encapsulation is accomplished utilizing a fluidized bed of the flavoring agent or fragrance.

Yang, U.S. Pat. No. 4,740,376, discloses encapsulating an active ingredient in a solvent free encapsulation composition which includes a blend of a high molecular weight polyvinyl acetate and a hydrophilic plasticizer. The active ingredient is protected from deterioration due to moisture and is provided with controlled release for use in a product to be ingested by a mammal.

Cherukuri et al., U.S. Pat. No. 4,981,698, discloses a delivery system for sweeteners that comprises a first high intensity sweetener encapsulated in a first core coating, and a second outer hydrophilic coating containing up to the solubility limit of the second coating of a second sweetener. The delivery system offers enhanced up front sweetness intensity in combination with prolonged sweetness duration, and improved protection and stability of the sweetener.

Cherukuri et al., U.S. Pat. No. 5,004,595, discloses a free-flowing particulate delivery system for providing enhanced flavor and sweetness to comestible products. The delivery system includes an encapsulating matrix that protects flavor in a core.

Cherukuri et al., U.S. Pat. No. 5,266,335, discloses microencapsulated flavoring agents and methods for preparing the same. The microencapsule comprises a flavoring agent and a resin in the core, and a coating layer over the core. The core is encapsulated by emulsion of a flavoring agent and a resin with a coating layer prepared by complex coacervation of a mixture of two or more colloidal materials.

Kehoe, U.S. Pat. No. 4,975,270, discloses elastomer encased active ingredients. The active ingredients are physically encased in non-porous, chewable particles of elastomer. The particles are then incorporated into articles of commerce.

There are a number of disadvantages when using the traditional encapsulation processes to encapsulate active ingredients. The disadvantages include the need for heat and moisture in order to properly form the encapsulated final product. Also, most encapsulation methods are complex and consume large amounts of time in order to obtain the final encapsulated product. Further, current encapsulated ingredients vary in size from nanometers to about 400 microns, and the active ingredients are not uniformly distributed throughout the encapsulated product. In addition, encapsulated actives many times do not withstand the rigors associated with the process of making confectionery products.

Bunick et al., EP 0 273 001, discloses a prior art soft, sugarless aerated confectionery composition in which the temperatures attained during processing reach 155 to 185° C., a temperature at which most prior art encapsulations would be unstable.

A further problem is encountered when the active ingredients are vitamins and minerals. It is difficult to add both vitamins and minerals to a confectionery or chewing gum product because, in general, vitamins are many times incompatible with minerals when attempting to add both to a comestible product.

Therefore, there remains a need for an alternate encapsulation method for providing a product with high levels of active ingredients and in which water is not needed during the encapsulation process, nor is heat an essential feature of the encapsulation process. There also remains a need for an alternate encapsulation method which produces capsules with uniform active ingredient content throughout the product, and that can withstand mechanical pressure both in the processing of the capsule and in the chewing of the product in the mouth so that the active ingredients are released in the stomach of the consumer.

BRIEF SUMMARY OF THE INVENTION

Applicant has unexpectedly produced an alternative method for preparing an encapsulated product comprising the steps of:
a) blending an active ingredient with a compressible material to form a compressible mixture;
b) mixing said compressible mixture with a lubricating material to form a tableting mixture;
c) compressing said tableting mixture into a caplet having a diameter from about 1 millimeter to about 7 millimeters and a length from about 1 millimeter to about 7 millimeters.

The present inventive subject matter is also directed to a novel encapsulated product, comprising:

a) at least one active food ingredient;
b) at least one compressible material; and
c) at least one lubricating material;
d) wherein said encapsulated product is in the form of a caplet having a diameter of from about 1 millimeter to about 7 millimeters and a length from about 1 millimeter to about 7 millimeters.

Further, the inventive subject matter is directed to a confectionery composition comprising:
a) a confectionery; and
b) at least one active ingredient in the form of a caplet having a diameter from about 1 millimeter to about 7 millimeters and a length from about 1 millimeter to about 7 millimeters.

In addition, the present inventive subject matter is directed to an enhanced nutritional bar comprising:
a) a nutritional bar; and
b) at least one active ingredient in the form of a caplet having a diameter from about 1 millimeter to about 7 millimeters and a length from about 1 millimeter to about 7 millimeters.

Still further, the present inventive subject matter is directed to a dry beverage composition comprising:
a) a dry beverage; and
b) at least one active ingredient in the form of a caplet having a diameter from about 1 millimeter to about 7 millimeters and a length from about 1 millimeter to about 7 millimeters.

And yet even further, the present inventive subject matter is directed to a baked composition comprising:
a) a baked good; and
b) at least one active ingredient in the form of a caplet having a diameter from about 1 millimeter to about 7 millimeters and a length from about 1 millimeter to about 7 millimeters.

An advantage of method of the inventive subject matter is that no heat nor moisture is required for forming the encapsulated product. High levels of active ingredients are obtainable in the products of the inventive subject matter, even though heat or moisture is not required for forming the encapsulated product. In addition, the encapsulated product of the present inventive subject matter has a uniform active ingredient content and may be strong enough to withstand mechanical pressure both in the processing of the product, and in the chewing of the product in the mouth so that the active ingredients are released in the stomach.

DETAILED DESCRIPTION OF THE INVENTION

The encapsulated product of the present invention is a caplet containing a surprisingly high amount of an active ingredient. Applicant has unexpectedly determined that flavors can be entrapped by adsorption and compressed with high load into a small encapsulated product. The void space of the resultant product is very low, particularly when polyols are used as the compressible material, as will be discussed hereinafter.

In a preferred embodiment of the present invention, the encapsulated product of the present inventive subject matter is a caplet shaped like a capsule and having a diameter from about 1 millimeter to about 7 millimeters and a length from about 1 millimeter to about 7 millimeters. Preferably, the diameter of the encapsulated product is about 3 millimeters and the length is about 3 millimeters. The caplets may be coated with a thin surface film to protect the product from moisture or water absorption, from flavor release in the final product system, and from heat and rupture during processing and chewing.

The alternative method of preparing an encapsulated product of the present inventive subject matter contemplates converting liquid active ingredients, including flavors, into small dry caplets or capsules. Powder materials are also available for conversion using the novel method of the inventive subject matter. The novel method is a simple compression process for compacting high levels of active ingredients into a small piece size.

As used herein, the term "active ingredient" includes without limitation: flavors, sweeteners, coloring agents, food additive, spice, herbal ingredients, non-herbal ingredients, medicaments, vitamins, minerals, caffeine, other effervescent agents, and mixtures thereof.

The encapsulated product of the present inventive subject matter contemplates the addition of flavors to confectionery and/or chewing gum products. The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including, without limitation, lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used.

When at least one of the active ingredients of the present inventive encapsulated product is a flavor, the encapsulated product is made according to the following method. If the flavor to be added is liquid, then the liquid flavor is first absorbed onto a solid absorbent. Examples of absorbents on which the liquid may be absorbed include, without limitation, silica gel particles, starches, carbohydrates such as sugars and polyhydroxyalcohols, celluloses, calcium salts such as calcium phosphate, calcium carbonate, and calcium sulfonate, and other absorbing agents in free-flowing powder form. The amount of liquid flavor added depends on the final concentration desired. Generally, though, the liquid flavor will be present in quantities from about 0.1% to 70% by weight of the resultant flavor/absorbent mixture.

The flavor/absorbent mixture is then mixed with a compressible material. Selection of a proper compressible material is dependent on whether the final encapsulated product is to be sugar-free or not. If the encapsulated product is to contain sugar, then the compressible material is, without limitation, a sugar product such "Di-Pac" from the Domino Sugar Corp., a dextrose such as "Cantab" from Compton Knowles Inc., or other compressible sugar materials. If, on the other hand, the encapsulated product is to be sugar-free, then examples of the compressible material are, without limitation, sorbitol, isomalt, maltitol, xylitol, lactitol, calcium phosphates, microcrystalline celluloses, polydextrose, erythritols, other compressible materials and mixtures thereof. Preferably, the compressible material is sorbitol. The flavor/absorbent material is mixed with the compressible material in a dry powder mixer. The amount of compressible material to be added will vary depending on the final encapsulated product. Generally, though, the amount of compressible material added will be such that the flavor will be constitute from about 0.1% to about 70% by weight of the flavor/absorbent/compressible material mixture.

The flavor/absorbent/compressible material mixture is further mixed with a tableting or lubricating material. The lubricating material forms a film around the particles of the material and helps the material flow, compress and eject from the tableting machine. The lubricant or lubricating material may be present in levels up to 5% by weight of the final composition. Examples of usable lubricating materials include, without limitation, fats, emulsifiers, waxes, magnesium stearate, calcium stearate, talc, starches, silicon dioxide, and mixtures thereof. Among the fats, or fatty materials, useful herein include, without limitation, water-insoluble, inert hydrocarbon fats or oils, or their derivatives and mixtures thereof. Such fats or fatty materials include, for example and without limitation, cocoa butter, hydrogenated vegetable tallow, hydrogenated vegetable oils, and derivative mixtures thereof.

Among the emulsifiers useful herein include, without limitation, alkyl aryl sulfonates, alkyl sulfates, sulfonated amides and amines, sulfated and sulfonated esters and ethers, alkyl sulfonates, polyethoxylated esters, mono- and diglycerides, diactyl tartaric esters of monoglyderides, polyglycerol esters, sorbitan esters and ethoxylates, lactylated esters, propylene glycol esters, sucrose esters and mixtures thereof. Among the waxes useful herein include, without limitation, amorphous waxes, anionic emulsifying waxes, bleached waxes, caranda waxes, cetyl esters, cationic emulsifying waxes, microcrystalline waxes, paraffins, refined waxes and mixtures thereof.

The use of particular fats, emulsifiers or waxes may allow the encapsulated product of the present inventive subject matter to provide controlled release of the active ingredient. The controlled release occurs due to the entrapment of the active material in the particular fat, emulsifier or wax.

Furthermore, other additives such as colors, binders, etc. may also be added to this mixture to form the final mixture. The final mixture is then formed into the encapsulated product of the present invention by using a tableting machine. The stations of the tableting machine are set to the desired caplet size, which is from about 1 millimeter to about 7 millimeters diameter and length for the encapsulated.

The flavor content of the final encapsulate product is from about 0.1% to about 70% by weight depending on the absorption system, compression material, and type of flavor. Preferably, the flavor content is from about 1.0% to about 15% by weight when the flavor is initially in liquid form, and from about 10% to about 40% by weight when the flavor is in solid form. Other dry active ingredients could be present in levels approaching 99% by weight depending on the compression granule.

The use of flavor as the active ingredient in the encapsulated product allows for flexibility in adding flavor to food items, confectionery products or chewing gum products. For example, delivery of two or more flavors to a single food item is possible by using encapsulated products containing different flavors in the food item. The delivery of two or more flavors is also possible in confectionery products and chewing gum products.

While the above final step of the method is preferred, other alternate final steps of preparing encapsulated products are contemplated as being within the scope of the inventive subject matter. In particular, the inventive subject matter also contemplates forming larger tablets with the tableting machine, then grinding the larger tablets into smaller pieces. A further final step is forming the sheets of the final product using roller compaction techniques, then grinding the sheets.

Advantages of preparing the inventive encapsulated product in this manner are that no heat and no moisture are needed in this process. Additionally and surprisingly, high concentrations of flavor (as well as other active ingredients) may be incorporated into the final encapsulated product. For example, flavors from about 1% to about 70% of the encapsulated product are possible by using the present inventive subject matter. Furthermore, the encapsulated product of the present inventive subject matter is small enough that when the confectionery or chewing gum product is chewed, the encapsulated product can pass with the saliva and not be disformed by the teeth of the individual chewing.

The present inventive subject matter also contemplates incorporating, without limitation, sweeteners, food additives, spices, herbal ingredients, non-herbal ingredients, vitamins, minerals, drugs, medicaments and mixtures thereof.

Examples of sweeteners that are available as active ingredients include, without limitation, solid natural or synthetic sweeteners such as amino acid based sweeteners, dipeptide sweeteners, especially aspartame, glycerrhizin, saccharin and its salts, acesulfame salts, cyclamates, steviosides, talin, dihydrochalcone compounds and mixtures thereof. The sweetener is generally present in the encapsulated product from about 0.1% to about 99% by weight of the final encapsulated product. The present inventive subject matter also contemplates having a blend of the above sweeteners as the active ingredient in the encapsulated product. Furthermore, the amount of sweetener contained in one caplet of the encapsulated product may be a dosage equivalent to one teaspoon of sugar. This will allow users of the encapsulated products ease in selecting the number of caplets to be used.

Examples of vitamins that are available as active ingredients include, without limitation, vitamin A (retinol), vitamin D (cholecalciferol), vitamin E group (α-tocopherol and other tocopherols), vitamin K group (phylloquinones and menaquinones), thiamine (vitamin $B_1$), riboflavin (vitamin $B_2$), niacin, vitamin $B_6$ group, folic acid, vitamin $B_{12}$ (cobalamins), biotin, vitamin C (ascorbic acid), and mixtures thereof. The amount of vitamin or vitamins present in the final encapsulated product of the present inventive subject matter is dependent on the particular vitamin and is generally the United States' Department of Agriculture Recommended Daily Allowances (USRDA) for that vitamin. For example, if vitamin C is the active ingredient and the encapsulated product is being used in a confectionery or chewing gum targeting adults, the amount of vitamin C in the encapsulated product would be 60 milligrams, which is the USRDA of vitamin C for adults.

Examples of minerals that are available as active ingredients include, without limitation, calcium, magnesium, phosphorus, iron, zinc, iodine, selenium, potassium, copper, manganese, molybdenum and mixtures thereof. As is the case with vitamins, the amount of mineral or minerals present in the final encapsulated product of the present inventive subject matter is dependent on the particular mineral and is generally the USRDA for that mineral. For example, if iodine is the active ingredient and the encapsulated product is being used in a confectionery or chewing gum targeting adults, the amount of iodine in the encapsulated product would be 150 micrograms, which is the USRDA of iodine for adults.

Examples of herbals that are available as active ingredients include, without limitation, echinacea, peppermint, licorice, goldenseal, panax pseudoginseng, grapeseed extract, bilberry, kava, ginko biloba, panax quinquefolium, Siberian ginseng, St. John's wort, bromelian, guglupids, hawthorn, garlic, ginger, angelica species, dandelion, goldenseal, and mixtures thereof. Further, examples of spices that are available as active ingredients include, without limitation, mustard, dillweed, cinnamon, garlic, black pepper, onion, sage, oregano, basil, cream of tartar, targon, cayenne pepper, red pepper, and mixtures thereof. This list of herbals and spices is for exemplary purposes and is not meant to be construed as limiting the inventive subject matter thereto.

Examples of drugs or medicaments that are available as active ingredients in the present inventive subject matter include the following. The amount of active material present in the inventive compositions will vary depending on the particular active used, but generally will be present in an amount of about 0.001% to 99% by weight of the composition. Preferably, the active ingredients used in the inventive compositions are prophylactic or therapeutic active ingredients. Prophylactic or therapeutic active materials which can be used in the present invention are varied. A non-limiting list of such materials includes the following: antitussives, antihistamines, decongestants, alkaloids, mineral supplements, laxatives, vitamins, antacids, ion exchange resins, anti-cholesterolemics, antiarrhythmics, antipyretics, analgesics, non-steroidal anti-inflammatory drugs (NSAIDs) including naproxen sodium and ketofen, appetite suppressants, expectorants, anti-anxiety agents, anti-ulcer agents, anti-inflammatory substances, coronary dilators, cerebral dilators, peripheral vasodilators, anti-infectives, psycho-tropics, antimanics, stimulants, gastrointestinal agents, sedatives, antidrrheal preparations, anti-anginal drugs, vasodialators, anti-hypertensive drugs, vasoconstrictors, migraine treatments, antibiotics, tranquilizers, anti-psychotics, antitumor drugs, anticoagulants, antithrombotic drugs, hypontics, anti-emetics, anti-nausants, anti-convulsants, neuromuscular drugs, hyper- and hypoglycemic spasmodics, uterine relaxants, mineral and nutritional additives, antiobesity drugs, anabolic drugs, erythropoetic drugs, antiashmatics, cough suppressants, mucolytics, anti-uricemic drugs and mixtures thereof.

Preferred prophylactic or therapeutic active materials contemplated for use in the present inventive subject matter are analgesics. Examples of analgesics useful in the present inventive subject matter, and which are the preferred therapeutic active ingredients, include, without limitation, aspirin, acetaminophen, ibuprophen and mixtures thereof.

It is possible to provide a coating on the encapsulated product. The coating provides protection of the active ingredients from moisture or water absorption. The coating may also allow the release of the active ingredient in the stomach of the individual, and not in the mouth thereof.

The present inventive subject matter also contemplates the use of the encapsulated product in a food item, a confectionery product, a nutritional bar or a chewing gum product.

The preparation of confectionery formulations is historically well known and has changed little through the years. Confectionery items have been classified as either "hard" or "soft" confectionery. The encapsulated product of the present inventive subject matter can be incorporated into confectionery compositions by admixing the inventive product into conventional hard and soft confections.

As used herein, the term "confectionery" means a product containing a bulking agent selected from a wide variety of materials such as sugar, corn syrup and, in the case of sugarless bulking agents, sugar alcohols such as sorbitol and mannitol. Confectionery material may include exemplary substances as lozenges, tables, toffee, nougat, chewy candy and so forth. In general, the bulking agent will comprise from about 5 to about 99% and preferably 20 to 95% by weight of the activated confectionery product.

Lozenges are forms intended to be sucked and held in the mouth. They may be in the form of various shapes, the most common being flat, circular, octagonal and biconvex forms. The lozenge bases are generally in two forms, hard boiled candy lozenges and compressed tablet lozenges.

Hard boiled candy lozenges may be processed and formulated by conventional means. In general, the hard boiled candy lozenges are prepared from a mixture of sugar and other carbohydrates that are kept in an amorphous or glassy condition. This form can be considered a solid syrup of sugars generally having form about 0.5 to about 1.5% moisture. Such materials normally contain up to about 92% corn syrup, up to about 70% sugar and form 0.1% to about 5.0% water. The syrup component generally is prepared from corn syrups high in fructose, but may include other materials. Further active ingredients such as flavoring, sweeteners, vitamins, minerals, and the like may also be added in accordance with the present invention.

Boiled candy lozenges may also be prepared from non-fermentable sugars such as sortitol, mannitol, and hydrogenated corn syrup. A typical hydrogenated corn syrup ois lycasin. The candy lozenges may contain up to about 95% sorbitol, a mixture of sorbitol and mannitol at a ration of about 9.5 to 0.5 up to about 7.5 to 2.5 and hydrogenated corn syrup up to about 55% of the syrup component.

Boiled candy lozenges may be routinely prepared by conventional methods such as those involving fire cookers, vacuum cookers, and scraped-surface cookers also referred to as high speed atmospheric cookers. The following discuss examples of preparing hard using the various traditional methods.

Fire cookers involve the traditional method of making a boiled candy lozenge base. In this method, the desired quantity of carbohydrate bulking agent is dissolved in water by heating the agent in a kettle until the bulking agent dissolves. Additional bulking agent may then be added and cooking continued until a final temperature of 145° C. to 156° C. is achieved. The batch is then cooled and worked as a plastic-like mass to incorporate additive or the encapsulated products of the present inventive subject matter.

A high-speed atmospheric cooker uses a heat-exchanger surface which involves spreading a film of candy on the heat-exchange surface, and the candy is heated to 165° C. to 170° C. in a short amount of time. The candy is then rapidly cooled to 100° C. to 120° C. and worked as a plastic-like mass enabling the incorporation of additives or the encapsulated products of the present inventive subject matter.

In vacuum cookers, the carbohydrate bulking agent is boiled to 125° C. to 132° C., vacuum is applied and additional water is boiled off without extra heating. When cooking is complete, the mass is a semi-solid and has a plastic-like consistency. At this point, additives or the encapsulated products of the present inventive subject matter are admixed in the mass by routine mechanical mixing operations.

The optimum mixing required to uniformly mix the additives and encapsulated products into to boiled lozenge mass is determined by the time needed to obtain a uniform distribution therethrough. Normally, mixing times from about 4 to 10 minutes have been found acceptable.

Once the boiled candy lozenge has been properly tempered, it may be cut into workable portions or formed into desired shapes. A variety of forming techniques may be utilized depending upon the shape and size of the final product desired.

The apparatus useful in accordance with incorporating the encapsulations of the present inventive subject matter into the hard confections comprise cooking and mixing apparatus well known in the confectionery manufacturing arts, and therefore the selection of the specific apparatus will be apparent to the artisan.

In addition to hard confectionery materials, the lozenges in which the present inventive encapsulations may be incorporated may be made of soft confectionery materials such as those contained in nougat, chewy candy and the like. These materials contain two primary components, namely a high boiling syrup such as corn syrup, hydrogenated starch hydrolysate or the like, and a relatively light texture frappe, generally prepared form gelatin, egg albumen, milk proteins such as casein, and vegetable proteins such as soy protein, and the like. The frappe is generally relatively light, and may, for example, range in density from about 0.5 to about 0.7 g/cc.

The high boiling syrup, or "bob syrup" of the soft confectionery is relatively viscous and has a higher density than the frappe component, and frequently contains a substantial amount of carbohydrate bulking agent such as a hydrogenated starch hydrolysate. Conventionally, the final nougat composition is prepared by the addition of the "bob syrup" to the frappe under agitation, to for the basic nougat mixture. Further ingredients such as flavoring agents, additional carbohydrate bulking agents, coloring agents, preservatives, and the present inventive product containing active ingredients may be added thereafter also under agitation.

The procedure to make soft confectionery items generally involves the formation of a boiled sugar-corn syrup blend to which is added a frappe mixture. The boiled sugar-corn syrup blend may be prepared from sugar and corn syrup blended in parts by weight ratio of about 90 to 10 to about 10 to 90. This blend is heated to temperatures above 121° C. to remove water and to form a molten mass. The frappe is generally prepared from gelatin, egg albumen, milk proteins such as casein, and vegetable proteins such as soy protein, and the like which are added to a gelatin solution and rapidly mixed at ambient temperature to form an aerated sponge-like mass. The frappe is then added to the molten candy base and mixed until homogenous at temperatures between 65° C. and 121° C.

The encapsulated product of the present invention can then be added as the temperature of the mixture is lowered to about 65–93° C., whereupon additional ingredients may be further added. The soft confectionery formulation is then cooled and formed to pieces of desired dimensions.

The inventive subject matter of the present application also contemplates the use of the encapsulated product in jelly gum confections or fruit chews. Jelly gum confections which typically include familiar candies such as gum drops, gum slices, fruit gums, i.e. imitation fruit pieces or fruit chews, jellybeans, "gummy bears", and other "gummy" candies are usually resilient, relatively rigid, and have a short texture. While many compositions have been employed in the preparation of such confections, most typically comprise an aqueous dispersion of various sweeteners and a gelling starch component. The aqueous dispersions are typically deposited hot into molds to set to shape. The aqueous dispersions preferably have thin hot viscosities which upon cooling set to provide firm gel structures.

The hot flow viscosity of the dispersion should be thin to afford easy handling during deposition. If the dispersion is too thick, misshaped candies may result due to nonuniform amounts of gum being deposited. Undesirable tailing may also occur, which is a result of the inability of the thick dispersion to form a clean break after deposition into one mold prior to deposition into a subsequent mold The basis of jelly gum confections is a sugar/glucose syrup combination and a gelatinizing agent, which may be gelatin, agar, gum arabic, maltodextrin, pectin or a modified starch. Various other gums may be used but to a lesser extent in confectionery. The gelatinizing material must be properly dissolved in water prior to mixing with the sugar glucose syrup combination. However, care must be taken in order to make certain that the gelatinizing agent does not consolidate during the process for making the jelly gum confection. If pectin is used as the gelatinizing agent, then the pectin should first be dry mixed with the sugar prior to addition of the dry mixture to water.

As can be seen above, the processes employed to produce confectioneries can be very harsh. In the past, this harshness has made it difficult to incorporate encapsulated ingredients into the confectionery product. However, given the strength and stability of the encapsulated products of the present inventive subject matter, the use of them in a confectionery does not compromise the active ingredient. The inventive encapsulated products are able to withstand the heat and mechanical working of the confectionery making process.

A distinct advantage of the use of the present inventive encapsulated product in confectionery items is that the use allows for multiple flavors to be added to the same confectionery item, whether that item be a hard confectionery, a soft confectionery, or a jelly gum confectionery. For example, a confectionery may include an inventive encapsulated product that will supply an orange flavor to the confection, as well as another encapsulated product that will supply lemon flavor. Or, as another non-limiting example, two different encapsulated products may be added to the same confectionery and supply peppermint and spearmint flavors to the confectionery, respectively.

Likewise, the use of multiple inventive encapsulated products in the confectioneries allows for the introduction of one or more colors into the confectionery in a visually stimulating manner. If, for example, the confectionery is clear or transparent, the addition of the encapsulated product may enhance the confectionery by adding color, as well as the flavors above. This allows the confectionery to be tailored to target certain purchasers. An example would be if the confectionery is clear, an individual's favorite sports team could be represented by the colors of the encapsulated product incorporated into the confection. For instance, a clear confection aimed at a fan of the Baltimore Ravens could have purple and black encapsulated products incorporated into the clear confection, with the purple and black encapsulated products supplying the same or different flavors to the confection. Likewise, a confection aimed at a fan of the University of Maryland could have red and black encapsulated products introduced into the clear confection.

Also, a distinct advantage of using different colors in the same confectionery is that the colors could signal the presence of different flavors or different drugs. A yellow encapsulated product, for example, could signify a lemon flavor and a red encapsulated product could signify a cherry flavor. The combinations and permutations for the colors and flavors is virtually endless. Likewise, the use of a color for one drug and the use of a different color for another drug is also possible. As is stated above, the use of the individual encapsulated products as drug carriers allows for incompatible drugs to be delivered to a patient at the same time.

If the confectionery is opaque, then the incorporation of the inventive encapsulated product allows for other sensory enhancement. The taste or feel of the confectionery could be greatly enhanced by the use of the encapsulated product in the confectionery. Again, the use of different colors for the encapsulated product aids in indentifying the different tastes or textures of the confectionery.

The inventive subject matter of the present application also contemplates the use of the encapsulated product in confectionery or nutritional bars. Nutritional bars may be made by routine and methods conventional in the industry. In an exemplary process of manufacturing a confectionery or nutritional bar, use is made of cold forming or extrusion. Other types of extrusion processes are used in the food industry, and is necessary to clearly demarcate the differences between the cold forming or extrusion used in the manufacture of confectionery type bars, and the process of cooking extrusion used in the manufacture of other types of shaped or formed food objects, since both are often referred to as "extrusion."

In the process of cold forming/extrusion, the mix required consists of a blend of powders, some or all of which are capable of absorbing water (moisture) or otherwise hydrating, and concentrated solutions of various other ingredients, such as the carbohydrate. The powders absorb water from the concentrated solutions and the individual ingredients in the powder part of the mixture then hydrate. The hydrated molecules (which are generally proteins or complex carbohydrates such as starches) then exhibit affinity through the formation of weak intermolecular forces which can be electrostatic in nature, and can include bonds such as hydrogen bonds as well as van der Waals forces. The carbohydrate (or other) constituent of the original liquid remains entrained in the complex of hydrated molecules, as may other materials (such as fats) that are added to the mixture. A measure of the emulsifying power of the hydrated molecules is indeed to see how much fat or oil can be thus entrained or coated with protein, since the hydrophobic nature of fat or oil makes greater demands on the strength of interaction between the hydrated molecules.

It is equally possible, though less desirable, to mix the hydrateable materials and the carbohydrate (or other) constituents and then add water. The quality and integrity of product thus produced may be inferior due to poor dispersion. Addition of water alone to hydrateable protein gives a mass that lacks adequate integrity and cohesion and is not suitable for cold forming; this limitation is not necessarily present for hydrateable carbohydrates.

The process above is intended to give a plastic mass which can then be shaped, without further physical or chemical changes occurring, by the procedure known as cold forming or extrusion. In this process, the plastic mass is forced at relatively low pressure through a die which confers the desired shape and the resultant extrudate is then cut off at an appropriate position to give products of the desired weight.

The mass may, for example, be forced through a die of small cross-section to form a ribbon, which is carried on a belt moving at a predetermined speed under a guillotine type cutter which operates at regular intervals. The cutter, in this case, generally consists of a sharpened blade so adjusted that it cuts through the ribbon but not the underlying belt, but may also consist of a wire. In both cases, the principle is the same; the cutting process occurs at intervals that permit the moving ribbon to be cut into pieces of equivalent weight and dimensions. Generally, this is achieved by timing the cutting strokes and maintaining belt speed at an appropriate level, but there also exist computer controlled versions of this mechanism which offer greater versatility. Alternatively, the mass may be forced through a die of large cross-section and the cut at die level into slices by an oscillating knife or wire, which drop onto a moving belt and are thus transported away. The mass may also be extruded as a sheet, which is then cut with a stamp type cutter into shapes that are appropriate, such as a cookie type cutter. Finally, the mass may also be forced into chambers on a rotary die equipped with an eccentric cam that forces the thus-formed material out of the chamber at a certain point in the rotation of the cylindrical die.

After shaping, the formed product is moved by a transfer belt or other type of material conveyor to an area where it may be further processed or simply packaged. In general, a nutritional bar of the type described would be enrobed (coated) in a material that may be chocolate, a compound chocolate coating, or some other type of coating material. In all such cases, the coating material consists of a fat that is solid at room temperature, but that is liquid at temperatures in excess of, e.g., 88.degree. F., together with other materials that confer the organoleptic attributes. The coating is thus applied to the bar while molten, by permitting the bar to pass through a falling curtain of liquid coating, at the same time passing over a plate or rollers which permit coating to be applied to the under surface of the bar, and excess coating is blown off by means of air jets, Finally, the enrobed bar passes through a cooling tunnel where refrigerated air currents remove heat and cause the coating to solidify.

In all these variations, the requirement is that the plastic mass be relatively soft, possessed of sufficient integrity to maintain its form after shaping. Other methods for producing nutritional bars are well-known in the art.

A further use for the encapsulated products of the present inventive subject matter is in baked goods such as cookies, biscuits and cakes. The encapsulated product is able to withstand the mechanical processing and heat required to prepare cookies, cakes and biscuits. In many instances, the mechanical processing and high temperatures required for preparing baked goods causes a breakdown of the active ingredients incorporated into the baked good. However, the superior strength and reliability of the present inventive encapsulated product keeps the active ingredients from decomposing or breaking down due to the mechanical processes and high temperatures encountered when baking the items.

The use of the inventive encapsulated products allows a person to incorporate multiple sweeteners, flavors, colorings and the like into the baked goods. In addition, in order to aid in the compliance of a person taking drugs, pharmaceuticals may be incorporated into the baked goods. The present inventive encapsulated product also allows incompatible ingredients, for example vitamins and minerals, to be included in the same baked item. Each of the incompatible items are incorporated into their own encapsulated product, which are then incorporated into the baked good of choice, whether that baked good be a cookie, brownie, cake, biscuit, etc.

The baked goods in which the present inventive encapsulated products are useful include without limitation cookies, cakes, brownies, and biscuits. Recipes for each of the types of baked goods are well-known in the food art and readily available to those skilled therein. The amount of encapsulated product to be included within the particular baked good is easily ascertainable by a skilled artisan based on the characteristics desired by that artisan. In general, each of the baked goods will include a starch binder which functions to form a congealed mass of the ingredients present in the baked good. The baked good also includes a sweetening agent, which may or may not be in the form of the present inventive encapsulated product, flour, and optional leavening ingredients. As is stated above, specific compositions and recipes are well-known for baked goods of each type.

The encapsulated products of the present inventive subject matter may also be used in dry beverages. Current dry mixes used to prepare many instant or ready-to-drink beverages, especially instant flavored coffee beverages, typically comprise a mixture of non-dairy creamers, sweeteners, soluble beverage components (e.g. instant coffee products use soluble coffee) and flavors. The inventive encapsulated products may be used to supply the dry beverages with sweeteners, soluble beverage components, flavors, and colors.

As used herein, "dry beverages" means a beverage in which a liquid, most likely water, is added in order to obtain the final beverage for consumption by the user. Examples of such beverages include without limitation hot chocolate, coffee, presweetened fruit drinks, teas, and the like. The encapsulated products of the present invention may be incorporated in each of these types of dry beverages and may add coloring, flavor, sweetener, pharmaceuticals or other active ingredients to the final beverage.

As is stated above, the inventive subject matter also includes the incorporation of the encapsulated product into a chewing gum product. As used herein, the term chewing gum means a product containing a chewing gum formulation. In general, the chewing gum formulation will comprise from about 5 to about 99% and preferably 20 to about 95% by weight of the enhanced chewing gum product.

With regard to a chewing gum formulation, such formulations will contain a gum base and various additives, such as sweeteners and flavors which may be supplied by the encapsulated product of the present invention. The gum base employed will vary greatly depending on various factors such as the type of base used, consistency desired and other components to make the final product. In general, amounts of about 5% to about 45% by weight of the final chewing gum composition are acceptable for use in chewing gum compositions with preferred amounts of about 15% to about 25% by weight. The gum base may be any water-soluble gum base well known in the art. Illustrative examples of suitable polymers in gum bases include both natural and synthetic elastomers and rubbers. For example, those polymers which are suitable in gum bases, include, without limitation, substances of vegetable origin such as chicle, jelutong, gutta percha and crown gum. Synthetic elastomers such as butadiene-styrene copolymers, isobutylene-isoprene copolymers, polyethylene, polyisobutyliene and polyvinylacetate and mixtures thereof, are particularly useful.

The gum base component may contain elastomer solvents to aid in softening the elastomer component. Such elastomer solvents may comprise methyl, glycerol and pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of polymerized rosin, glycerol ester of tall oil rosin, glycerol ester of wood rosin and partially dydrogenated wood rosin and partially hydrogenated methyl ester of rosin, such as polymers of alpha-pinene and beta-pinene; terpene resins including polyterpene and mixtures thereof. The solvent amy be employed in an amount ranging from about 10% to about 75% and preferably about 45% to about 70% by weight to the gum base.

A variety of traditional ingredients such as plasticizers or softeners such as lanolin, stearic acid, sodium stearate, potassium stearate, glyceryl triacetate, glycerine and the like as well as natural and synthetic waxes, petroleum waxes, such as 35 polyurethane waxes, paraffin waxes and microcrystalline waxes may also be incorporated into the gum base to obtain a variety of desirable textures and consistency properties. These individual additional materials are generally employed in amounts of up to about 30% by weight and preferably in amounts from about 3% to about 20% by weight of the final gum composition.

The chewing gum composition may also include additional fillers such as aluminum hydroxide, alumina, aluminum silicates, calcium carbonate, and talc and combinations thereof. These fillers may also be used in the gum base in various amounts. Preferably the amount of fillers when used will vary from about 4% to about 30% by weight of the final chewing gum composition.

Further, the chewing gum composition will include one or more encapsulated products of the present invention. The encapsulated products of the present invention may provide sweeteners, colorants, and/or flavors to the chewing gum product. The amount of each encapsulated product employed in the chewing gum product will depend on what the encapsulated product is adding to the chewing gum product.

The present inventive subject matter also contemplates the use of the encapsulated product in various other food items, including, without limitation, yogurt, frostings on cakes, nutrition bars, granola bars, candy bars, and the like. The present inventive subject matter also contemplates the use of the encapsulated product in various pharmaceutical applications.

As is stated above, an advantage of method of the inventive subject matter is that no heat nor moisture is required for forming the encapsulated product. In addition, the encapsulated product of the present inventive subject matter has a uniform active ingredient content and may be strong enough to withstand mechanical pressure both in the processing of the product, and in the chewing of the product in the mouth so that the active ingredients are released in the stomach.

The following examples are illustrative of preferred embodiments of the invention and are not to be construed as limiting the invention thereto. All percentages are given in weight percent, unless otherwise noted and equal a total of 100%.

EXAMPLES

EXAMPLE 1

Preparation of 1% Cherry Flavor Food Enhancement Product 20 grams of liquid cherry flavor was mixed into 20 grams of Syloid 244 and 10 grams of Maltrin M-700. The resultant mixture was further mixed with 1930 grams of DiPac compressible sucrose material. 20 grams of magnesium stearate and 9 grams of red food coloring were then added to the mixture, resulting in 2009 grams of the final mixture. The final mixture was mixed for 3 minutes. The mixture was loaded into a tableting machine.

A series of caplets 3 millimeters in length and 3 millimeters in diameter was produced using 20 KN of force. The punch was then changed in the tableting machine and a series of caplets 1.3 millimeters in length and 1.3 millimeters in diameter was produced using 20 KN of force.

EXAMPLE 2

Preparation of 1.4% Sugar-Free Peppermint Flavor Encapsulated Product 36 grams of liquid peppermint flavor was mixed with 54 grams of Syloid 244. The resultant mixture was further mixed with 2880 grams of sorbitol. 30 grams of magnesium stearate was then added to the mixture, resulting in 3000 grams of the final mixture. The final mixture was mixed for 3 minutes before the mixture was loaded into a tableting machine. A encapsulated product containing 1.4% peppermint flavor in a 3-millimeter caplet was produced.

EXAMPLE 3

Preparation of 2.7% Sugar-Free Peppermint Flavor Encapsulated Product 16 grams liquid peppermint flavor was added to 24 grams of Syloid 244. The resultant mixture was further mixed with 1000 grams of the final mixture from Example 2 above. 5 grams of magnesium stearate was then added to the mixture, resulting in 1045 grams of the final mixture. The final mixture was mixed for 3 minutes before the mixture was loaded into a tableting machine. A encapsulated product containing 2.7% peppermint flavor in a 3-millimeter caplet was produced.

EXAMPLE 4

Preparation of 1% Winterqreen Flavor Food Enhancement Product 20 grams of liquid wintergreen flavor was mixed into 20 grams of Syloid 244 and 10 grams of Maltrin M-700. The resultant mixture was further mixed with 1930 grams of DiPak compressible sucrose material. 20 grams of magnesium stearate was then added, resulting in 2000 grams of the final mixture. The final mixture was mixed for 3 minutes. The mixture was loaded into a tableting machine.

A series of caplets 3 millimeters in length and 3 millimeters in diameter was produced using 20 KN of force. The punch was then changed in the tableting machine and a series of caplets 1.3 millimeters in length and 1.3 millimeters in diameter was produced using 20 KN of force.

EXAMPLE 5

Preparation of 4.0% Sugar-Free Peppermint Flavor Encapsulated Product 120.00 grams of liquid peppermint flavor was mixed with 180.00 grams of Syloid 244. The resultant mixture was further mixed with 2670.00 grams of sorbitol. 30.00 grams of magnesium stearate was then added to the mixture, resulting in 3000.00 grams of the final mixture. The final mixture was mixed for 3 minutes before the mixture was loaded into a tableting machine. A encapsulated product containing 4.0% peppermint flavor in a 3-millimeter caplet was produced.

EXAMPLE 6

Preparation of 10% Aspartame Sweetener Encapsulated Product 200 grams of aspartame sweetener was mixed with 20 grams of magnesium stearate. The resultant mixture was further mixed with 1,780 grams of maltitol, resulting in 2000 grams of the final mixture. The final mixture was mixed for 3 minutes before the mixture was loaded into a tableting machine. An encapsulated product containing 10% aspartame in a 3-millimeter caplet was produced.

EXAMPLE 7

Preparation of 3.0% Folic Acid Encapsulated Product 60 grams of folic acid was mixed with 20 grams of magnesium stearate. The resultant mixture was further mixed with 1920 grams of maltitol, resulting in 2000 grams of the final mixture. The final mixture was mixed for 3 minutes before the mixture was loaded into a tableting machine. An encapsulated product containing 3.0% folic acid in a 3-millimeter caplet was produced.

EXAMPLE 8

Preparation of 1.0% Sugar-Free Wintergreen Flavor Encapsulated Product 20 grams of liquid wintergreen flavor was mixed with 10 grams of HPMC. The resultant mixture was further mixed with 1950 grams of diabasic calcium phosphate dihydrate. 20 grams of magnesium stearate was then added to the mixture, resulting in 2000 grams of the final mixture. The final mixture was mixed for 3 minutes before the mixture was loaded into a tableting machine. A encapsulated product containing 1.0% wintergreen flavor in a 3-millimeter caplet was produced.

EXAMPLE 9

Preparation of 1.0% Sugar-Free Wintergreen Flavor Encapsulated Product 20 grams of liquid wintergreen flavor was mixed with 10 grams of HPMC. The resultant mixture was further mixed with 1950 grams of microcrystalline cellulose. 20 grams of magnesium stearate was then added to the mixture, resulting in 2000 grams of the final mixture. The final mixture was mixed for 3 minutes before the mixture was loaded into a tableting machine. A encapsulated product containing 1.0% wintergreen flavor in a 3-millimeter caplet was produced.

EXAMPLE 10

Preparation of 5.0% Sugared Wintergreen Flavor Encapsulated Product 100 grams of liquid wintergreen flavor was mixed with 150 grams of HPMC. The resultant mixture was further mixed with 1730 grams of Cantab brand dextrose. 20 grams of magnesium stearate was then added to the mixture, resulting in 2000 grams of the final mixture. The final mixture was mixed for 3 minutes before the mixture was loaded into a tableting machine. A encapsulated product containing 5.0% wintergreen flavor in a 3-millimeter caplet was produced.

EXAMPLE 11

Preparation of 7.5% Sugar-Free Wintergreen Flavor Encapsulated Product 150 grams of liquid wintergreen flavor was mixed with 225 grams of HPMC. The resultant mixture was further mixed with 1605 grams of maltitol. 20 grams of magnesium stearate was then added to the mixture, resulting in 2000 grams of the final mixture. The final mixture was mixed for 3 minutes before the mixture was loaded into a tableting machine. A encapsulated product containing 7.5% wintergreen flavor in a 3-millimeter caplet was produced.

EXAMPLE 12

Preparation of 7.5% Sugar-Free Wintergreen Flavor Encapsulated Product 150 grams of liquid wintergreen flavor was mixed with 225 grams of HPMC. The resultant mixture was further mixed with 1605 grams of maltitol. 20 grams of magnesium stearate was then added to the mixture, resulting in 2000 grams of the final mixture. The final mixture was mixed for 3 minutes before the mixture was loaded into a tableting machine. A encapsulated product containing 7.5% wintergreen flavor in a 3-millimeter caplet was produced.

EXAMPLE 13

Preparation of 10% Sugar-Free Wintergreen Flavor Encapsulated Product 200 grams of liquid wintergreen flavor was mixed with 300 grams of HPMC. The resultant mixture was further mixed with 1480 grams of maltitol. 20 grams of magnesium stearate was then added to the mixture, resulting in 2000 grams of the final mixture. The final mixture was mixed for 3 minutes before the mixture was loaded into a tableting machine. A encapsulated product containing 10% wintergreen flavor in a 3-millimeter caplet was produced.

EXAMPLE 14

Preparation of 10% Sugar-Free Wintergreen Flavor Encapsulated Product 200 grams of liquid wintergreen flavor was mixed with 300 grams of HPMC. The resultant mixture was further mixed with 1480 grams of maltitol. 20 grams of magnesium stearate was then added to the mixture, resulting in 2000 grams of the final mixture. The final mixture was mixed for 3 minutes before the mixture was loaded into a tableting machine. A encapsulated product containing 10% wintergreen flavor in a 3-millimeter caplet was produced.

EXAMPLE 15

Preparation of 10% Sugared Wintergreen Flavor Encapsulated Product 200 grams of liquid wintergreen flavor was mixed with 300 grams of HPMC. The resultant mixture was further mixed with 1480 grams of Cantab brand dextrose. 20 grams of magnesium stearate was then added to the mixture, resulting in 2000 grams of the final mixture. The final mixture was mixed for 3 minutes before the mixture was loaded into a tableting machine. A encapsulated product containing 10% wintergreen flavor in a 3-millimeter caplet was produced.

EXAMPLE 16

Preparation of 10% Sugared Wintergreen Flavor Encapsulated Product 200 grams of liquid wintergreen flavor was mixed with 300 grams of HPMC. The resultant mixture was further mixed with 1480 grams of Cantab brand dextrose. 20 grams of magnesium stearate was then added to the mixture, resulting in 2000 grams of the final mixture. The final mixture was mixed for 3 minutes before the mixture was loaded into a tableting machine. A encapsulated product containing 10% wintergreen flavor in a 3-millimeter caplet was produced.

EXAMPLE 17

Preparation of 50% Aspartame Sweetener Encapsulated Product 1000 grams of aspartame sweetener was mixed with 20 grams of magnesium stearate. The resultant mixture was further mixed with 1000 grams of maltitol, resulting in 2000 grams of the final mixture. The final mixture was mixed for 3 minutes before the mixture was loaded into a tableting machine. An encapsulated product containing 50% aspartame in a 3-millimeter caplet was produced.

EXAMPLE 18

Preparation of 96.5% Aspartame Sweetener Encapsulated product 1930 grams of aspartame sweetener was mixed with 20 grams of magnesium stearate. The resultant mixture was further mixed with 50 grams of maltitol, resulting in 2000 grams of the final mixture. The final mixture was mixed for 3 minutes before the mixture was loaded into a tableting machine. An encapsulated product containing 96.5% aspartame in a 3-millimeter caplet was produced.

EXAMPLE 19

Preparation of 1% Sugar-Free Ginko Biloba Encapsulated Product 20 grams of ginko biloba is mixed with 300 grams of HPMC. The resultant mixture is further mixed with 1660 grams of maltitol. 20 grams of magnesium stearate is then added to the mixture, resulting in 2000 grams of the final mixture. The final mixture is mixed for 3 minutes before the mixture is loaded into a tableting machine. An encapsulated product containing 1% ginko biloba in a 3-millimeter caplet is produced.

EXAMPLE 20

Preparation of 1% Sugar-Free Siberian Ginseng Encapsulated Product 20 grams of Siberian ginseng is mixed with 300 grams of HPMC. The resultant mixture is further mixed with 1660 grams of maltitol. 20 grams of magnesium stearate is then added to the mixture, resulting in 2000 grams of the final mixture. The final mixture is mixed for 3 minutes before the mixture is loaded into a tableting machine. An encapsulated product containing 1% Siberian ginseng in a 3-millimeter caplet is produced.

EXAMPLE 21

Preparation of a Low-calorie Hard Candy Containing the Inventive Encapsulated Product as a Flavorant 50.4 grams of isomalt (an equal mixture of gluco-mannitol and gluco-sorbitol), 10 grams of polydextrose, 3 grams of arabic powder and 0.1 grams of aspartame are dry mixed. To the dry mixture is added 25 grams of hydrogenated glucose syrup and 6 grams of water under stirring conditions. The slurry is then heated in a jet cooker under a vacuum to the boiling point. The mixture is then continuously heated to 92 brix. The mixture is removed from the heat and 0.75 grams of citric acid and 0.75 grams of malic acid are added, along with 4 grams of the encapsulated product from Example 16. The mixture is poured into a mold, allowed to cool, then released to provide the finished product.

EXAMPLE 22

Preparation of a Hard Candy Containing the Inventive Encapsulated Product as a Flavorant 56 grams of sugar, 20 grams of dextrose, and 5 grams of arabic powder are dry mixed. To the dry mixture is 13.5 grams of water under stirring conditions. The slurry is then heated in a jet cooker under a vacuum to the boiling point. The mixture is then continuously heated to 92 brix. The mixture is removed from the heat and 0.75 grams of citric acid and 0.75 grams of malic acid are added, along with 4 grams of the encapsulated product from Example 16. The mixture is poured into a mold, allowed to cool, then released to provide the finished product.

EXAMPLE 23

Preparation of a Gummy Candy Containing the Inventive Encapsulated Product as a Flavorant 2.5 grams of agar, 0.25 grams of sodium citrate, and 23 grams of sucrose are dry mixed to form blend A. Blend A is then stirred into 22.15 grams of water and heated to 195° F. 25 grams of glucose syrup and an additional 23 grams of sucrose are added to the mixture and heat is continuously applied until the temperature of the mixture reaches 195° F. again. The heat is maintained until the solution has reached the final soluble solids (75–77% brix). 4 grams of the encapsulated product from Example 1 is added along with other colors. The pH is then adjusted to 3.3 to 3.5 with about 0.1 grams of (50%) citric acid. The mixture is removed from the heat and poured into a mold at a temperature no lower than 170° F., allowed to cool to 40° F. for 2 hours, then allowed to dry at room temperature for 24 hours.

EXAMPLE 24

Preparation of a Gummy Candy Containing the Inventive Encapsulated Product as a Flavorant 5 grams of pectin and 52 grams of sugar are dry mixed. The dry mixture is added to 31.6 grams of water with thorough mixing being accomplished by a lightning mixer. The blend is heated in a water bath to 90–100° C. 4 grams of Cerelose 2001, 3 grams of gellatin, 0.4 grams of citric acid and 4 grams of the encapsulated product of Example 1 are then added. The mixture is continuously heated until brix are at 78. The mixture is then poured into granulated sugar and allowed to set.

EXAMPLE 25

Preparation of a Gummy Candy Containing the Inventive Encapsulated Product as a Flavorant 2 grams of agar and 18.6 grams of sucrose are dry mixed to form blend A. 41.5 grams of water, 28.2 grams of corn syrup (42 DE) and 5.7 grams of invert sugar are poured into a steam jacketed kettle. The mixture is heated to 90–100° C. with agitation supplied by a lightning mixer. Blend A and 4 grams of the encapsulated product from Example 1 is added to the mixture and heat is continuously added until brix is between 85–90. The final product is then poured into a starch mold to dry.

EXAMPLE 26

Preparation of a Gummy Candy Containing the Inventive Encapsulated Product as a Flavorant 2.5 grams of agar and 14.8 grams of sucrose are dry mixed to form blend A. Blend A is then mixed with 22.6 grams of water in a separate kettle under stirring conditions. In a steam jacketed kettle, 56.5 grams of high fructose corn syrup is heated to 90° C., at which point the water/sugar slurry and 4 grams of the encapsulated product of Example 1 is added. The mixture is heated to 100° C. and cooked until brix or solids is 76–78%. The mixture is then cooled to 75–77° C. and the pH is adjusted to 3.5 with the addition of citric acid. The final mixture is then poured into a starch mold.

The inventive subject matter being thus described, it will be obvious that the same may be varied in many ways. Such variations are not to be regarded as a departure from the spirit and scope of the inventive subject matter, and all such modifications are intended to be included within the scope of the following claims.

What is claimed is:

1. A confectionery composition comprising:
    a) a confectionery; and
    b) at least one active ingredient in the form of a caplet having a diameter from about 1 millimeter to about 7 millimeters and a length from about 1 millimeter to about 7 millimeters.

2. The confectionery composition of claim 1 wherein said active ingredient is selected from the group consisting of: flavors, sweeteners, spices, herbal ingredients, vitamins, minerals, drugs and mixtures thereof.

3. The confectionery composition of claim 2 wherein said active ingredient is at least one flavor.

4. The confectionery composition of claim 1 wherein said diameter is about 3 millimeters and said length is about 3 millimeters.

5. The confectionery composition of claim 2 wherein said composition provides controlled release of said active ingredient.

6. The confectionery composition of claim 1 wherein the confectionery is a soft confectionery.

7. The confectionery composition of claim 1 wherein the confectionery is a hard confectionery.

8. The confectionery composition of claim 1 wherein the confectionery is a jelly gum confectionery.

9. The confectionery composition of claim 1 wherein the confectionery is clear or transparent.

10. The confectionery composition of claim 1 further comprising at least two actives in the form of caplets having a diameter from about 1 millimeter to about 7 millimeters and a length from about 1 millimeter to about 7 millimeters.

11. The confectionery composition of claim 10 wherein said actives each provide different colors to said confectionery composition.

12. The confectionery composition of claim 10 wherein said actives each provide different flavors to said confectionery composition.

13. The confectionery composition of claim 10 wherein said actives provide incompatible substances.

14. The confectionery composition of claim 13 wherein said incompatible substances are vitamins and minerals.

15. The confectionery composition of claim 13 wherein said incompatible substances are incompatible drugs.

16. The confectionery composition of claim 10 wherein the actives each provide different colors to the confectionery composition, said different colors indicating the presence of different drugs.

17. The confectionery composition of claim 10 wherein the actives each provide different colors to the confectionery composition, said different colors indicating the presence of different flavors.

18. The confectionery composition of claim 1 further comprising at least two actives in the form of caplets having a diameter from about 1 millimeter to about 7 millimeters and a length from about 1 millimeter to about 7 millimeters; wherein said actives are distinguished based on their colors, flavors, drugs, or other distinguishing indicia.

19. An enhanced nutritional bar comprising:
  a) a nutritional bar; and
  b) at least one active ingredient in the form of a caplet having a diameter from about 1 millimeter to about 7 millimeters and a length from about 1 millimeter to about 7 millimeters.

20. The enhanced nutritional bar of claim 19 wherein said active ingredient is selected from the group consisting of: flavors, sweeteners, spices, herbal ingredients, vitamins, minerals, drugs and mixtures thereof.

21. The enhanced nutritional bar of claim 20 wherein said active ingredient is vitamins.

22. The enhanced nutritional bar of claim 20 wherein said active ingredient is minerals.

23. The enhanced nutritional bar of claim 19 further comprising at least two actives in the form of caplets having a diameter from about 1 millimeter to about 7 millimeters and a length from about 1 millimeter to about 7 millimeters.

24. The enhanced nutritional bar of claim 23 wherein said actives provide incompatible substances.

25. The enhanced nutritional bar of claim 24 wherein said incompatible substances are vitamins and minerals.

26. The enhanced nutritional bar of claim 24 wherein said incompatible substances are incompatible drugs.

27. The enhanced nutritional bar of claim 24 wherein the actives each provide different colors to the confectionery composition, said different colors indicating the presence of different drugs.

28. A method of preparing a hard confectionery composition comprising the steps of:
  a) mixing at least one bulking agent present in the amount of about 5.0% to about 95% by weight with water present in the amount of about 5.0% to about 50% by weight to form a mixture;
  b) heating said mixture to a temperature from about 125° C. to about 185° C. until the mixture is sufficiently cooked;
  c) cooling said mixture to about 100° C.;
  d) mixing with said mixture from about 0.1% to about 20% by weight of an active ingredient in the form of a caplet having a diameter from about 1 millimeter to about 7 millimeters and a length from about 1 millimeter to about 7 millimeters;
  e) pouring said mixture from step d) into a mold; and
  f) allowing said mixture to set.

29. A method of preparing a soft confectionery composition comprising the steps of:
  a) blending sugar and corn syrup in parts by weight ratio of about 90 to 10 to about 10 to 90 to form a mixture;
  b) heating said mixture to a temperature above about 120° C.;
  c) preparing a frappe from the group consisting of gelatin, egg albumin, milk proteins, vegetable proteins and mixtures thereof;
  d) rapidly mixing said frappe at ambient temperatures to form an aerated mass;
  e) mixing the aerated mass with the sugar mixture until a homogeneous product is formed;
  f) lowering the temperature of the homogeneous product to about 60–100° C. and mixing with said homogeneous product from about 0.1% to about 20% by weight of an active ingredient in the form of a caplet having a diameter from about 1 millimeter to about 7 millimeters and a length from about 1 millimeter to about 7 millimeters;
  g) pouring said mixture from step f) into a mold; and
  h) allowing said mixture to set.

30. A method of preparing a jelly gum confectionery composition comprising the steps of:
  a) dry mixing a gelatinizing material present in an amount from about 0.1% to about 10% by weight with a bulking material present in an amount from about 10% to about 75% by weight to form a mixture;
  b) adding to said mixture water present in an amount from about 5% to about 30% by weight to form a second mixture;
  c) thoroughly mixing said second mixture and heating the same to a temperature of about 80–110° C.;
  d) lowering the temperature of the second mixture to about 60–100° C. and mixing therewith from about 0.1% to about 20% by weight of an active ingredient in the form of a caplet having a diameter from about 1 millimeter to about 7 millimeters and a length from about 1 millimeter to about 7 millimeters;
  e) pouring said mixture from step f) into a mold; and
  f) allowing said mixture to set.

31. A baked composition comprising:
  a) a baked good; and
  b) at least one active ingredient in the form of a caplet having a diameter from about 1 millimeter to about 7 millimeters and a length from about 1 millimeter to about 7 millimeters.

32. The baked composition of claim 31 wherein said active ingredient is selected from the group consisting of: flavors, sweeteners, spices, herbal ingredients, vitamins, minerals, drugs and mixtures thereof.

33. The baked composition of claim 32 wherein said active ingredient is at least one flavor.

34. The baked composition of claim 31 wherein said diameter is about 3 millimeters and said length is about 3 millimeters.

35. The baked composition of claim 32 wherein said composition provides controlled release of said active ingredient.

36. The baked composition of claim 31 further comprising at least two actives in the form of caplets having a diameter from about 1 millimeter to about 7 millimeters and a length from about 1 millimeter to about 7 millimeters.

37. The baked composition of claim 36 wherein said actives each provide different colors to said baked composition.

38. The baked composition of claim 36 wherein said actives each provide different flavors to said confectionery composition.

39. The baked composition of claim 36 wherein the actives each provide different colors to the confectionery composition, said different colors indicating the presence of different drugs.

40. The baked composition of claim 36 wherein the actives each provide different colors to the confectionery composition, said different colors indicating the presence of different flavors.

41. A dry beverage composition comprising:
a) a dry beverage; and
b) at least one active ingredient in the form of a caplet having a diameter from about 1 millimeter to about 7 millimeters and a length from about 1 millimeter to about 7 millimeters.

42. The dry beverage composition of claim 41 wherein said active ingredient is selected from the group consisting of: flavors, sweeteners, spices, herbal ingredients, vitamins, minerals, drugs and mixtures thereof.

43. The dry beverage composition of claim 42 wherein said active ingredient is at least one flavor.

44. The dry beverage composition of claim 41 wherein said diameter is about 3 millimeters and said length is about 3 millimeters.

45. The dry beverage composition of claim 41 further comprising at least two actives in the form of caplets having a diameter from about 1 millimeter to about 7 millimeters and a length from about 1 millimeter to about 7 millimeters.

* * * * *